US011791700B2

(12) United States Patent
Peschina et al.

(10) Patent No.: US 11,791,700 B2
(45) Date of Patent: Oct. 17, 2023

(54) APPARATUS FOR BENDING ENDS, ARRANGED IN ANNULAR LAYERS, OF BAR CONDUCTORS OF A STATOR OF AN ELECTRICAL MACHINE

(71) Applicant: FELSOMAT GmbH & Co. KG, Koenigsbach-Stein (DE)

(72) Inventors: Juergen Peschina, Knittlingen (DE); Peter Haberstroh, Neulingen (DE)

(73) Assignee: FELSOMAT GmbH & Co. KG, Koenigsbach-Stein (DE)

( * ) Notice: Subject to any disclaimer, the term of this patent is extended or adjusted under 35 U.S.C. 154(b) by 230 days.

(21) Appl. No.: 17/447,412

(22) Filed: Sep. 10, 2021

(65) Prior Publication Data

US 2021/0408877 A1    Dec. 30, 2021

Related U.S. Application Data

(63) Continuation of application No. PCT/EP2020/056557, filed on Mar. 11, 2020.

(30) Foreign Application Priority Data

Mar. 15, 2019    (DE) .................... 10 2019 203 575.2

(51) Int. Cl.
*H02K 15/04* (2006.01)
*H02K 15/00* (2006.01)

(52) U.S. Cl.
CPC ..... *H02K 15/0435* (2013.01); *H02K 15/0031* (2013.01); *H02K 15/0087* (2013.01); *Y10T 29/49009* (2015.01); *Y10T 29/53161* (2015.01)

(58) Field of Classification Search
CPC .......... H02K 15/0025; H02K 15/0031; H02K 15/0068; H02K 15/0081; H02K 15/0087;
(Continued)

(56) References Cited

U.S. PATENT DOCUMENTS 6,882,076 B2 *    4/2005    Masegi ............. H02K 15/0037
                                                         310/201
6,885,123 B2 *    4/2005    Gorohata ............ H02K 15/064
                                                         310/201
(Continued)

FOREIGN PATENT DOCUMENTS

DE        601 02 398 T2    2/2005
EP        1 117 172 A2     7/2001

*Primary Examiner* — Peter Dungba Vo
*Assistant Examiner* — Joshua D Anderson
(74) *Attorney, Agent, or Firm* — Orbit IP

(57) ABSTRACT

An apparatus for bending ends, arranged in annular layers, of bar conductors for an electrical machine are arranged in a stator main body having multiple coaxially arranged coupling elements with coupling recesses, by which the ends of the bar conductors can be taken layer by layer and plastically deformed. Each coupling element has a driving platform, which can be moved in the axial direction together with the coupling element. The coupling element belonging to a driving platform can be rotated on the driving platform. All of the driving platforms move axially on a common climbing linkage. Each driving platform has a dedicated first driving device for axially moving the driving platform and a dedicated second driving device for rotating the coupling element on the driving platform, wherein the two driving devices are moved axially, together with the driving platform. The apparatus is of a simple construction requiring little installation space.

16 Claims, 7 Drawing Sheets

(58) Field of Classification Search
CPC .......... H02K 15/0428; Y10T 29/49009; Y10T 29/49073; Y10T 29/53143; Y10T 29/53161
See application file for complete search history.

(56) References Cited

U.S. PATENT DOCUMENTS

| | | | |
|---|---|---|---|
| 7,140,098 B2* | 11/2006 | Maeda | H02K 15/0414 29/455.1 |
| 8,327,677 B2 | 12/2012 | Young | |
| 10,804,777 B2* | 10/2020 | Yoshida | H02K 15/0087 |
| 2001/0007169 A1 | 7/2001 | Takahashi et al. | |
| 2009/0302705 A1 | 12/2009 | Guercioni | |
| 2018/0375409 A1 | 12/2018 | Yoshida et al. | |

* cited by examiner

APPARATUS FOR BENDING ENDS, ARRANGED IN ANNULAR LAYERS, OF BAR CONDUCTORS OF A STATOR OF AN ELECTRICAL MACHINE

CROSS-REFERENCE TO RELATED APPLICATIONS

This continuation application claims priority to PCT/EP2020/056557 filed on Mar. 11, 2020 which has published as WO 2020/187670 A1 and also the German application number 10 2019 203 575.2 filed on Mar. 15, 2019, the entire contents of which are fully incorporated herein with these references.

DESCRIPTION

Field of the Invention

The invention relates to an apparatus for bending ends, arranged in at least four annular layers, of straight or bent bar conductors of a stator of an electrical machine, in particular of an electric motor or generator, wherein the apparatus comprises a holder, in particular a clamping holder, for the stator, wherein the apparatus comprises at least four coupling members which are arranged concentrically with respect to a center axis and which each have at a front end a large number of annularly arranged coupling recesses for gripping the ends of the bar conductors of one of the annular layers, respectively, and wherein the apparatus has for each coupling member a first drive device for displacing the coupling member in an axial direction of the center axis and a second drive device for rotating the coupling member about the center axis so that all the coupling members can be axially displaced and rotated independently of each other.

Background of the Invention

Such an apparatus is known from U.S. Pat. No. 8,327,677 B2.

Electrical machines, in particular electric motors, are increasing in significance, in particular in the field of traffic, because electrical energy can be converted with them locally and without emissions into power, for example, a driving force.

Electrical machines are generally based on electromagnetic interaction and induction. A typical electrical machine has a rotor, in which permanent magnets are arranged and which rotates relative to a stator, in which electrical coils are arranged, wherein the coils can act as electromagnets. In the electric motor, typically electric current is conducted through the coils of the stator and the rotor is thereby subjected to a force which rotates it. In a generator, the rotating rotor produces an electric current in the coils.

The coils of the stator can be wound with a continuous wire; however, stators, which are more powerful, can be produced by means of so-called bar conductors. In this instance, a frequent type of bar conductor is bar conductors bent in a U-shaped manner (also called "hairpins") which already provide at one side an electrical connection between the sides thereof; however, non-bent bar conductors which have free ends at both sides are also widespread.

In a stator, there are typically inserted a large number of initially individual (non-bent or bent) bar conductors which are then intended to be electrically connected to each other at the free ends thereof in accordance with a predetermined circuit diagram, typically by welding. To this end, in preparation the ends to be connected (end portions) of the bar conductors are mechanically bent in a circumferential direction (plastically deformed) in order to move together in the circumferential direction ends of bar conductors from adjacent radial layers which initially still have spacing in the circumferential direction. The term "twist machine" has also evolved for a corresponding machine for bending bar conductor ends.

U.S. Pat. No. 8,327,677 B2 describes a twist machine, in which four concentric radial layers of bar conductors can be bent in a circumferential direction; for each layer, there is provided an individual coupling apparatus which can grip the bar conductor ends of a layer with annularly arranged recesses, that is to say, the bar conductor ends at the same radius. In this case, each coupling apparatus is rotated with an individual machine axis and axially displaced with an individual machine axis. A total of eight servo motors are fixed on a machine frame for this purpose. The rotational and displacement actuation of the individual coupling apparatuses is carried out in this case via individual radially projecting arms, wherein it is not described in greater detail how the rotational actuation is decoupled from the displacement actuation at the drive side.

The twist machine described requires a large amount of structural space and has a complex construction which is inflexible as a result of the lever mechanism.

SUMMARY OF THE INVENTION

Object of the Invention

An object of the invention is to provide an apparatus for bending bar conductor ends which has a simpler and more compact construction.

Description of the Invention

This object is achieved by an apparatus of the type mentioned in the introduction which is characterized in that for each coupling member an individual drive platform is provided, wherein the coupling member is rotatable, but axially fixedly supported, on the respective drive platform about the center axis, in that the drive platforms are individually displaceably arranged on a common fixed jacking rod assembly along the center axis, wherein the jacking rod assembly comprises at least two jacking rods which are arranged parallel with the center axis, and in that a respective drive platform has:

the first drive device and the second drive device of the coupling member which belongs to the drive platform;

at least two jacking pieces for axially displacing the drive platform, wherein the jacking pieces are axially secured to the drive platform and are each connected to one of the jacking rods, and wherein the jacking pieces are driven by the first drive device; and a gear mechanism for rotating the coupling member relative to the drive platform, wherein the gear mechanism is coupled to the coupling member and is driven by the second drive device.

In the apparatus according to the invention (twist machine), there are configured a plurality of drive platforms which can be axially displaced individually on a common jacking rod assembly and therefore on an associated machine frame. An individual drive platform on which it is supported is associated with each coupling member.

The first (local) drive device for the axial displacement of the drive platform, for instance, a first servo motor, and the second (local) drive device for the rotation of the coupling member on the drive platform, for instance, a second servo motor, are installed on the respective drive platform. During the axial displacement of the drive platform by means of the first drive device, the associated coupling member which is axially fixedly supported on the drive platform (at least with respect to the force introduction direction of the bending process) is also carried, that is to say, axially displaced similarly. With the second drive device, the associated coupling member can be rotated relative to the drive platform thereof, wherein the drive platform is retained in a rotationally secure manner on the machine frame in particular via the jacking rod assembly. The coupling member can thereby be rotated relative to the machine frame and in particular the stator.

With this construction, the axial displacement and the rotation of the coupling member can readily be carried out by means of the drive platform independently of each other and also independently of the remaining coupling members on other drive platforms. No radially projecting arms which take up a large amount of structural space are required. All the drive platforms can move axially in particular on the same jacking rod assembly, which can be configured to be particularly compact and which is very cost-effective.

Preferred Embodiments

There is preferred an embodiment which provides for at least the outer coupling members to have a substantially cylinder-mantle-like front portion with a first diameter ED corresponding to a diameter of the annular arrangement of the coupling recesses and a similarly substantially cylinder-mantle-like rear portion with a second diameter ZD, with ZD>ED, the innermost coupling member also to have a front portion and a rear portion, particularly wherein this front portion is also constructed in a substantially cylinder-mantle-like manner with a first diameter EDI corresponding to a diameter of the annular arrangement of the coupling recesses of the innermost coupling member and this rear portion is also constructed in a substantially cylinder-mantle-like manner with a second diameter ZDI, preferably with ZDI>EDI, the front portions and the rear portions of the coupling members to be arranged in a state inserted one in the other, and the respective gear mechanism to be coupled to a coupling member at the rear portion of the respective coupling member. The front portions of the coupling members can be inserted one in the other in a compact manner corresponding to the annular layers of the bar elements on the stator. With the rear portions, the coupling members can be optimized for linking or support on the drive platforms, in particular by means of a larger diameter for better mechanical stability. For a compact structural form, the rear portions are also inserted one in the other. The cylinder-mantle-like portions of the coupling members which are inserted (coaxially) one in the other permit mutual axial guiding and allow the coupling members to be rotated relative to each other simultaneously and to be axially displaced relative to each other. It should be noted that the innermost coupling member can also be produced, for example, from solid material; for a light construction which saves material, however, cylinder-mantle-like portions are also preferred in this instance.

An embodiment is particularly preferred in which at least the drive platforms of the outer coupling members have an opening for introducing one or more coupling members which are located further inward. A particularly compact construction is thereby enabled.

In an advantageous embodiment, the jacking rods are constructed as threaded rods and the jacking pieces are constructed as threaded nuts. A precise, particularly low-play displacement of the drive platforms is thereby possible. The threaded rods are usually secured in the machine frame in a fixed and rotationally secure manner and the jacking pieces (which are axially secured on the respective drive platform) are rotated on the respective drive platform by means of the first drive device in order to displace the drive platform axially.

In an alternative, similarly preferred embodiment, the jacking rods are constructed as toothed racks and the jacking pieces are constructed as toothed wheels or worm gears. A particularly simple and robust displacement of the drive platforms is thereby possible. The toothed racks are usually secured in the machine frame in a fixed manner and the toothed wheels or worm gears (which are axially secured on the respective drive platform) are rotated on the respective drive platform by means of the first drive device in order to axially displace the drive platform.

An embodiment is particularly preferred in which the jacking rods are arranged symmetrically about the center axis, particularly wherein precisely two mutually opposite jacking rods are provided. As a result of the symmetrical arrangement, a laterally identical force introduction into the jacking rods can be ensured, which prevents tilting of the drive platform and therefore ensures a precise displacement of the drive platform, whereby a precise conversion of the axial compensation movement is achieved when the bar conductor ends are bent, and accordingly a precise bending of the bar conductor ends is achieved.

In a preferred embodiment, a first intermediate ring is rotatably supported about the center axis on a respective drive platform, wherein the first intermediate ring is driven by the first drive device and wherein the jacking pieces are each coupled at different locations to the first intermediate ring, particularly wherein the jacking pieces are arranged symmetrically relative to the center axis on the first intermediate ring. By means of the first intermediate ring, the force of the first drive device can be distributed uniformly over the jacking pieces and tilting of the drive platform by non-uniform introduction of force is prevented. If more than two jacking rods and jacking pieces are configured, preferably all the jacking pieces are coupled to the first intermediate ring at different locations. The first intermediate ring may be constructed as a toothed ring which is partially toothed or completely toothed.

An embodiment is also preferred in which the respective gear mechanism which is driven by the second drive device comprises a toothed wheel or a toothed rack and engages in a tooth arrangement on the coupling member or on a second intermediate ring which is rigidly connected to the coupling member. The force transmission to the coupling member for the rotation thereof via the teeth of a toothed wheel or the teeth of a toothed rack—and a suitable counter-tooth arrangement on the coupling member or on a second intermediate ring—is structurally particularly simple and robust. The second intermediate ring can be constructed as a toothed ring which is partially toothed or completely toothed. When a toothed rack is used, the rotation of the coupling member can be adjusted via a linear motor.

An embodiment is also advantageous in which the coupling recesses of a respective coupling member are constructed on an end piece which is secured to the remaining coupling member in a replaceable manner. By replacing the end pieces of the coupling members, adaptation to another type of stator can readily be carried out. Preferably, the anterior end piece completely comprises a cylinder-mantle-like front portion of the coupling member and preferably also an intermediate flange for connecting a rear, cylinder-mantle-like portion of the coupling member.

Furthermore, an embodiment is advantageous in which the coupling recesses at the front end of a respective coupling member are constructed in a crown-like manner. The crown-like construction requires only a small amount of material and further allows the bending of bar conductor ends which are located comparatively close together in a radial direction. In the crown-like construction, the coupling recesses are delimited only in a circumferential direction, but not in a radial direction. Alternatively, the coupling recesses can also be constructed as recesses which are completely surrounded (radially and in a circumferential direction); a particularly reliable gripping of the bar conductor ends is thereby ensured.

In a preferred embodiment, there is provision for the apparatus to further comprise a rail system having at least two fixed rails which extend parallel with the center axis, and for at least two counter-pieces which are each arranged in an axially displaceable manner on one of the rails to further be fixed or constructed on each drive platform. As a result of the rails which are arranged in a fixed manner on the machine frame, a particularly good stabilization (which is in addition to the jacking rod assembly) of the drive platforms against tilting can be achieved. Typically, the counter-pieces engage around the rails and/or engage in the rails.

An embodiment is also advantageous which provides for the holder for the stator to be arranged on an additional platform, wherein the additional platform is also displaceably arranged on the jacking rod assembly in an axial direction of the center axis, and for the additional platform to have an additional drive device and at least two additional jacking pieces for axially displacing the additional platform, wherein the additional jacking pieces are axially secured to the additional platform and are each coupled to one of the jacking rods, and wherein the additional jacking pieces are driven by the additional drive device. As a result of the axially displaceable additional platform, the amount for an axial movement of the coupling members can be reduced when the layers of the bar conductors are bent. The holder then carries out the main movement for the bending process and the coupling members further carry out only small differential movements. The fixing of the holder on the additional platform (and also of the stator in the holder) is usually rotationally secure. Alternatively, an additional platform for the holder can also be secured to the jacking rod assembly in a fixed manner (axially and rotationally).

In a further development of an embodiment of the apparatus with the rail system and axially displaceable additional platform for the holder, at least two additional counter-pieces which are each arranged on one of the rails in an axially displaceable manner are further fixed or constructed on the additional platform. The additional platform can again be mechanically stabilized better, in particular to prevent tilting.

The scope of the present invention also includes use of an above-described apparatus according to the invention for bending ends, which are arranged in at least four annular layers, of straight or bent bar conductors of a stator of an electrical machine, in particular of an electric motor or generator, wherein the stator is arranged in the holder, wherein the ends of the bar conductors, which are arranged in the stator, of a respective annular layer are engaged over by the coupling recesses of a coupling member, respectively, and wherein the axial movements and the rotational movements of the coupling members are controlled independently of each other, particularly wherein the directions of rotation alternate between the coupling members which follow each other radially. By rotating and axially displacing the coupling members, the ends of the bar conductors can be bent in a desired manner. The rotation determines how far the bar conductor ends are bent in a circumferential direction. As a result of the axial displacement, an effective axial shortening of the bar conductors is compensated for during bending in the circumferential direction so that the bar conductor ends are not released at the coupling recesses during the bending process. Preferably, the bar conductors have different axial lengths at the beginning of the bending process and the bending process, including the axial tracking of the coupling members, is carried out in such a manner that the ends of the bar conductors at the end of the bending process are located at the same axial height. In the context of the invention, all the machine axes (rotation and axial displacement for each drive platform) can be controlled individually for an optimum bending process.

In this case, a variant of this use is preferred, which provides for the strokes of the axial movements of the coupling members to increase in an outward direction when the ends of the bar conductors of the stator are bent, particularly wherein the rotation angle ranges of the rotational movements of the coupling members increase in an outward direction. With the axial strokes which increase outwardly, provision can be made for a greater effective change in length of the bent bar conductors further radially outward; with an angular deflection which is (approximately) identical, bar conductors located further outwardly are shortened more by bending in the circumferential direction than bar conductors which are located further inwardly as a result of the absolute bending paths in the circumferential direction being greater at further outward located positions. The actually driven rotation angle ranges of the rotational movements may include, in the context of the invention, overbending of the ends of the bar conductors beyond the desired end position in order to take into consideration a resilient springing-back of the ends after the bending processing operation. By increasing the actually driven rotational angle ranges in a radially outward direction, identical remaining rotational angle ranges can be achieved in all layers in particular after the spring-back action, and therefore a particularly precise production.

Other advantages of the invention will be appreciated from the description and the drawings. Similarly, the above-mentioned features and those set out below can be used according to the invention individually per se or together in any combinations. The embodiments shown and described are not intended to be understood to be a conclusive listing, but are instead of exemplary nature for describing the invention.

DETAILED DESCRIPTION OF THE PREFERRED EMBODIMENTS

The Figures schematically illustrate by way of example an embodiment of an apparatus according to the invention for bending bar conductor ends of a stator for an electrical machine, for example an electric motor or an electric generator.

Figure 1:
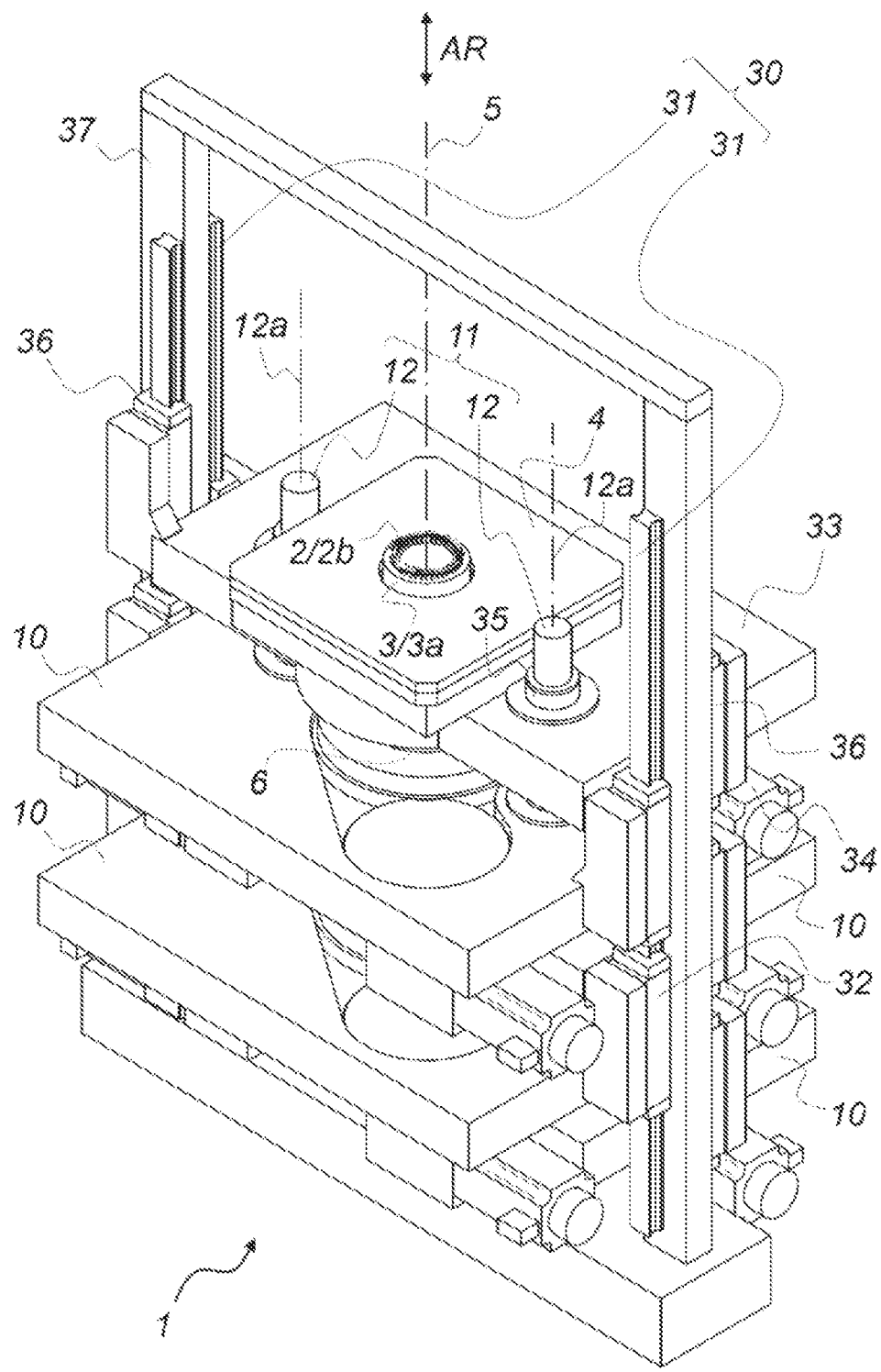
FIG. 1 is a schematic oblique view of an exemplary embodiment of an apparatus according to the invention.

FIG. 1 is a schematic oblique view of the apparatus 1. Using the apparatus 1, the ends of bar conductors 2 which are inserted into a stator 3 with a substantially cylinder-mantle-like stator base member 3a are intended to be bent. FIG. 1 shows the upper free ends 2b of the bar conductors 2; however, the apparatus is used to bend the lower, free ends (which are hidden in FIG. 1) of the bar conductors 2 (but note that it is also possible to insert the stator 3 into the apparatus 1 in a transposed manner so that the previously upper ends 2b of the bar conductors 2 then become lower ends which can then also be bent with the apparatus 1).

Figures 2A, 2C:
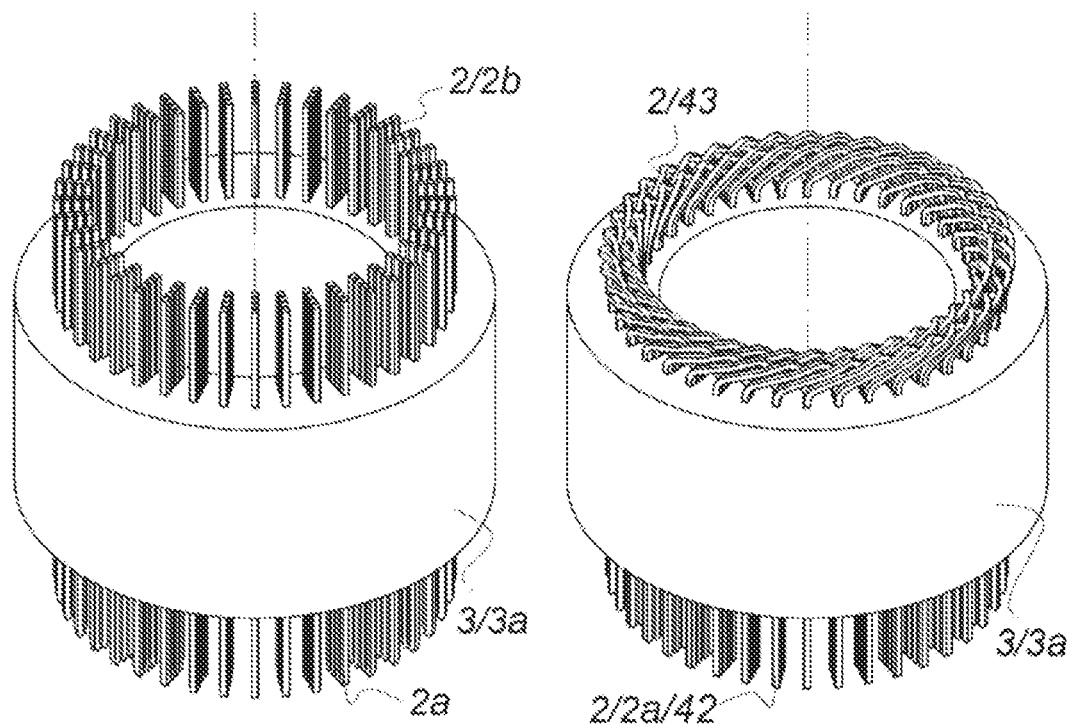
FIG. 2A is a schematic oblique view of the stator of FIG. 1 with bar conductors arranged therein for the invention.
FIG. 2C is a schematic oblique view of an alternative stator for the invention, wherein the bar conductors bent as "hairpins"
Figure 2B:
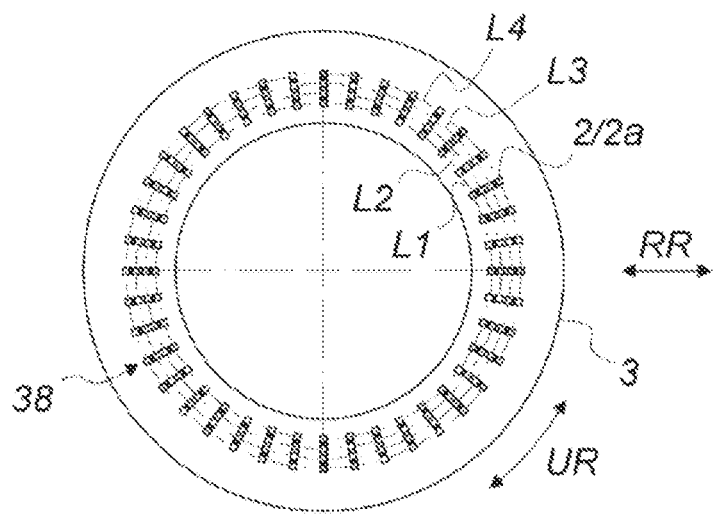
FIG. 2B is a schematic view from below of the stator of FIG. 2A.

FIG. 2A further shows the stator 3 and the bar conductors 2 which are retained therein and which project downward with lower ends (end portions) 2a out of the stator base member 3a of the stator 3 and which can be bent with the apparatus of FIG. 1. FIG. 2B is a view of the stator 3 from below.

The lower ends 2a of the bar conductors 2 intended to be bent are lined up in the as yet unbent state in rows 38 which extend in a radial direction RR and are inserted in corresponding recesses which are elongate in a radial direction RR for each row 38 in the stator base member 3a. In this instance, four ends 2a of bar conductors 2 are arranged in each row 38, in accordance with four annular layers L1, L2, L3, L4 of ends 2a of bar conductors 2.

As a result of the apparatus according to the invention, the lower ends 2a of the bar conductors 2 can be bent in a circumferential direction UR (also referred to as the azimuthal direction). In a typical bending process, for example, the ends 2a of the layer L1 are bent through a half intermediate row angle in a counter-clockwise direction and the ends 2a of the adjacent layer L2 are bent through a half intermediate row angle in a clockwise direction; similarly, the ends 2a of the layer L3 are bent through a half intermediate row angle in a counter-clockwise direction and the ends 2a of the adjacent layer L4 are bent through a half intermediate row angle in a clockwise direction. The fact that the bending direction alternates between the layers L1-L4 is preferred in the context of the invention. At the positions reached by the permanent deformation thereof (not illustrated), the overlapping ends 2a of the layers L1 and L2 and also of the layers L3 and L4 can then be welded to each other.

Again with reference to FIG. 1, the stator 3 is fixed in a holder 4, in this instance a clamping holder. This holder 4 is arranged on an additional platform 33 which is explained in greater detail below.

In the embodiment shown, the apparatus 1 comprises four so-called drive platforms 10; in other embodiments, more drive platforms can also be provided (for bending correspondingly more radial layers of bar conductor ends).

The drive platforms 10 are displaceable along a center axis 5 which extends centrally through the stator 3 and vertically in this instance. In this case, the drive platforms 10 move on a common jacking rod assembly 11 which is constructed here with two jacking rods 12. The jacking rods 12 are constructed in this case as threaded rods (the external thread of the jacking rods 12 is not illustrated in greater detail for the sake of simplicity). The jacking rods 12 extend parallel with the center axis 5, wherein the center axis 5 and middle axes 12a of the jacking rods 12 are located in a common plane (cf. the longitudinal section plane/plane of the drawing of FIG. 4 at the bottom), and are arranged in a fixed manner in a machine frame 37.

In addition, the drive platforms 10 are guided by means of a rail system 30 which comprises here a total of four rails 31 which are constructed in a fixed manner on the machine frame 37 (one of the rails 31 is hidden for the most part in FIG. 1).

The drive platforms 10 are each constructed with a first drive device for axially displacing the respective drive platforms 10 along the jacking rod assembly 11 and further with a second drive device for rotating a coupling member 6 which is supported on the respective drive platform 10 (which is hidden for the most part in FIG. 1, but see below).

The additional platform 33 has an additional drive device 34, in this case a servo motor which is coupled to two additional jacking pieces 35 in a manner not illustrated in greater detail (for instance, via an additional intermediate ring which is supported coaxially relative to the center axis 5). The additional jacking pieces 35 are secured on the additional platform 33 in an axial direction AR on the additional platform 33 (that is to say, cannot be displaced in an axial direction AR relative to the additional platform 33), but can be rotated via the additional drive device 34. The additional jacking pieces 35 are each constructed as threaded nuts (with an internal thread) and screwed onto the jacking rods 12. By rotating the additional jacking pieces 35 by means of the additional drive device 34, therefore, the additional platform 33 and with it the holder 4 and the stator 3, including the bar conductors 2 thereof, can be axially displaced.

In this case, the additional platform 33 further has additional counter-pieces 36 which engage in this instance around two of the rails 31 of the rail system 30 and which thereby guide the additional platform 33 and additionally secure it against tilting.

FIG. 2C shows an alternative stator 3 for the invention, in particular for the apparatus of FIG. 1. In this instance, the bar conductors 2 are bent in an approximately U-shaped manner ("hairpins"), wherein the legs 42 of the bar conductors 2 project downward and project with lower ends 2a which are intended to be bent over out of the stator base member 3a. At the top of the stator 3, there are arranged curved members 43 of the bar conductors 2 which connect the two legs 42 of a bar conductor 2. In this type of bar conductor 2, only one bending process and welding in the region of the free lower ends 2a of the bar conductors 2 are necessary, but not in the region of upper ends.

Figure 3A:
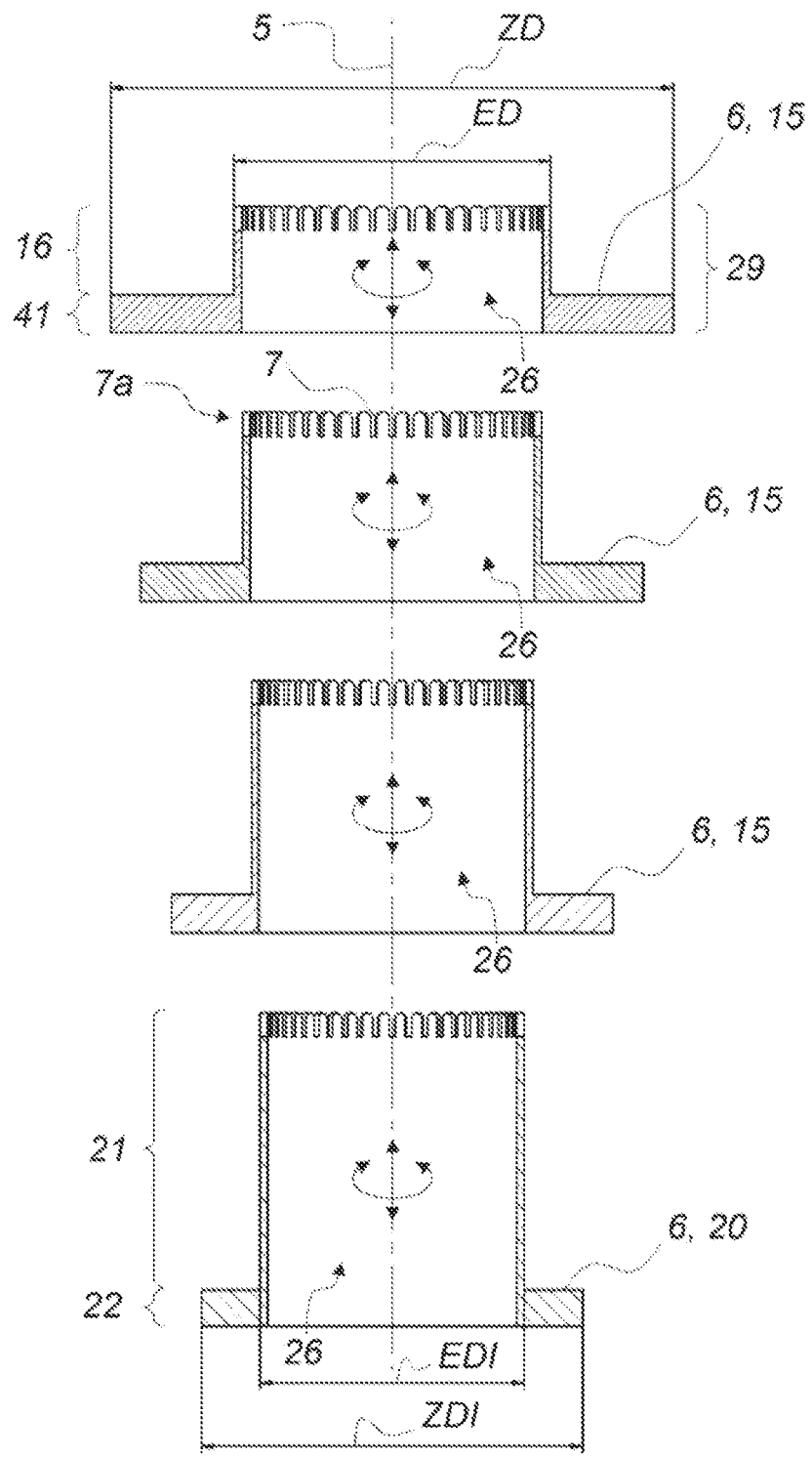
FIG. 3A is a schematic, exploded view of anterior end pieces of coupling members in longitudinal section for the apparatus of FIG. 1.

FIG. 3A is an exploded view of anterior (in this instance, upper) end pieces 29 of coupling members 6 for the apparatus of FIG. 1. The end pieces 29 comprise in this case a front portion 16 which is constructed in a substantially cylinder-mantle-like manner and an intermediate flange 41.

The upper portions 16 are in this case constructed with a so-called crown 7a at the front ends thereof, which are upper ends in FIG. 3a, wherein the crown 7a forms between two tines an axial return as a coupling recess 7. In total, each crown 7a has as many coupling recesses 7 as there are radial rows of (initially non-deformed) bar conductor ends at the bottom of the stator (cf. FIG. 2B in this regard). Using the tines, a respective crown 7a engages in the intermediate spaces between the radial rows of ends of bar conductors, and the ends of the bar conductors are then located accordingly in the coupling recesses 7 (not illustrated in greater detail).

The diameter of a respective crown 7a or the diameter of the front portion 16 of the coupling member 6, in this case referred to as the first diameter ED (or as EDI at the innermost coupling member 20), corresponds in this case to the diameter of the respective associated, annular layer of the ends of the bar conductors. By mutually rotating the coupling members 6 or the crowns 7a, the gripped ends of the bar conductors can be individually bent in all layers in a circumferential direction, wherein the coupling members 6 in all layers can be axially tracked individually.

The upper portions 16 each merge into an intermediate flange 41 at the lower side. At a respective intermediate flange 41, a similarly cylinder-mantle-like rear portion of the coupling member 6 is secured in a replaceable manner, for instance screwed on (not illustrated in FIG. 3A, but cf. FIG. 3B or FIG. 4 in this regard); this rear portion has the same outer diameter as the intermediate flange 41, in FIG. 3A depicted as a second diameter ZD (or as ZDI at the innermost coupling member 20).

In this case, the respective first diameter ED is smaller in each coupling member 6 than the respective second diameter ZD, that is to say, ED<ZD (or EDI<ZDI), whereby the coupling members 6 can be supported in a robust and secure manner on the drive platform, but simultaneously small bar conductor structures on the stator can also be produced or bent in a precise manner.

It should be noted that the (radial) first diameters ED and the (radial) second diameters ZD decrease in a downward direction in the coupling members 6 in the exploded illustration in order to be able to interlace the coupling members 6 radially one in the other in the assembled state (see below).

Figure 3B:
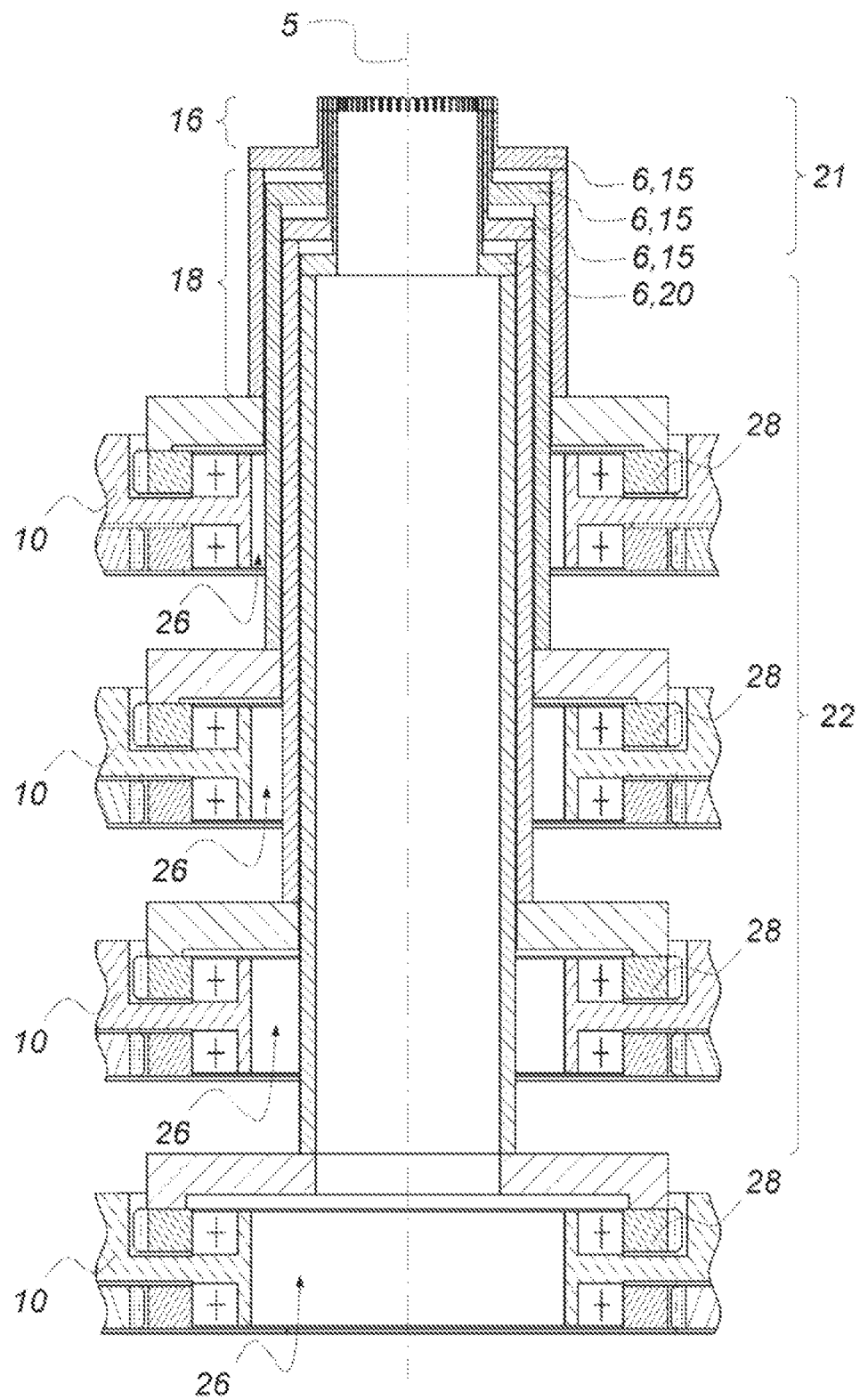
FIG. 3B is a schematic, longitudinal section through coupling members which are inserted one in the other for the apparatus of FIG. 1.
Figure 4:
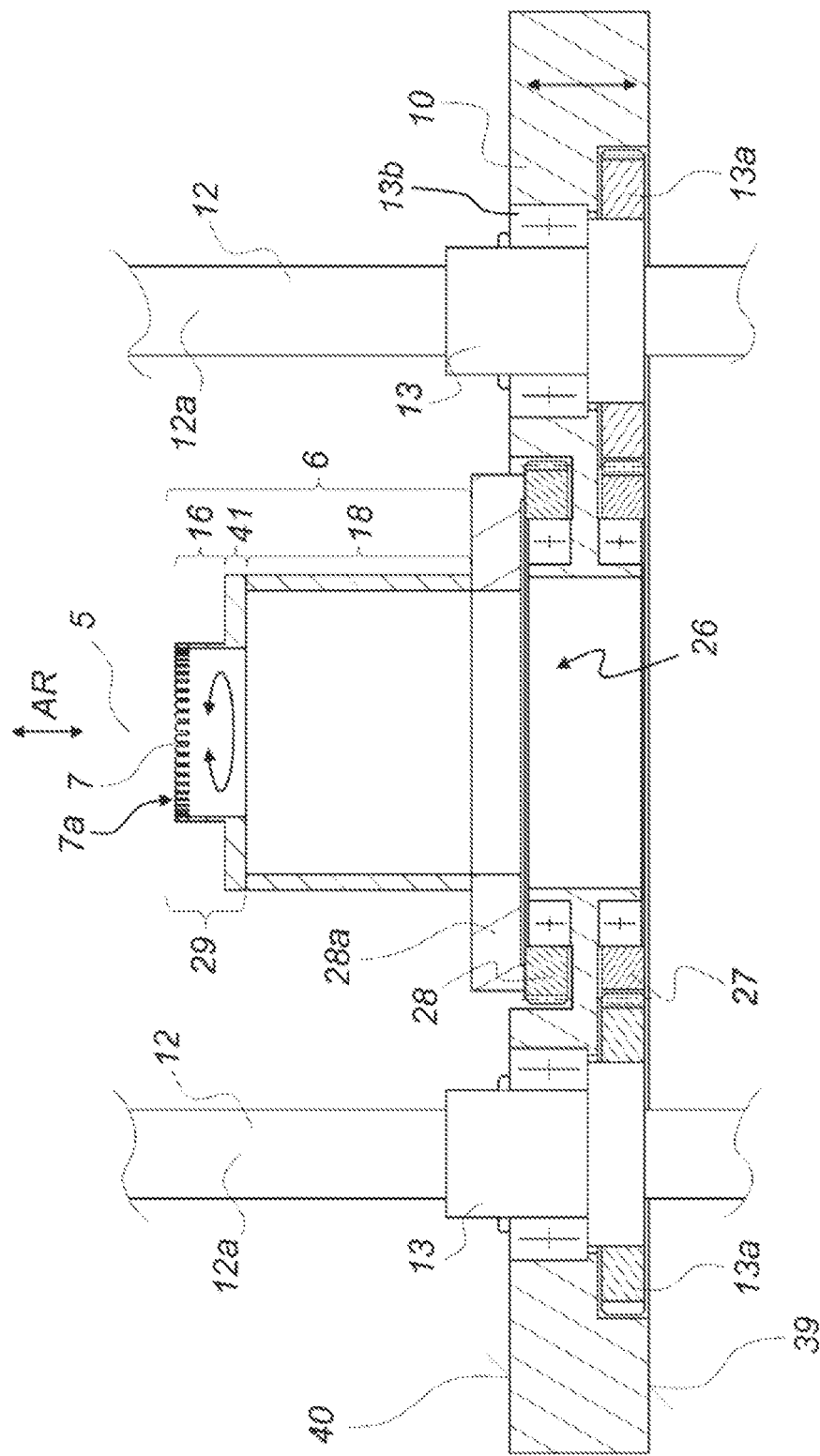
FIG. 4 is a schematic, longitudinal section through a drive platform including the associated coupling member for the apparatus according to FIG. 1.

The front portions 16 and rear portions 18 of the coupling members 6 in the assembled state can be seen in FIG. 3B (for example, marked for the uppermost/outermost coupling member 6, cf. also FIG. 4 in this regard). For a compact construction of the apparatus, the coupling members 6 are inserted one in the other ("arranged in an interlaced manner"), wherein the front (upper) portions 16 of the different coupling members 6 are inserted one in the other and also the rear (lower) portions (18) of the coupling members 6 are inserted one in the other (wherein they also project downwardly out of each other). The total of four coupling members 6 in this instance are rotatable relative to each other in this case and axially displaceable relative to each other (over a respective specific path length). To this end, the respective front portions 16 are constructed in a substantially cylinder-mantle-like manner and the respective rear portions 18 are also constructed in a substantially cylinder-mantle-like manner. The rear portions 18 are each supported on a drive platform 10 (only partially depicted, cf. in this regard FIGS. 4, 5A, 5B below). The walls of the front portions 16 of adjacent coupling members 6 are located in this case (with a certain play) adjacent to each other and the walls of the rear portions 18 of adjacent coupling members 6 are also located in this case (with a certain play) adjacent to each other; a mutual support is thereby achieved. All the portions 16, 18 of the four coupling members 6 are arranged coaxially relative to each other with respect to the center axis 5 in this case.

It should be noted that, in the embodiment shown, a cylinder-mantle-like form of the front portions 16 and the rear portions 18, that is to say, with an opening 26, is necessary only for the outer coupling members 15 in order to be able to guide through one or more coupling members 6 which are located radially further inward. In the innermost coupling member 20, the coupling member 20 can be produced in the front portion 21 and/or in the rear portion 22, for example, also of solid material or with radial stabilization struts (not illustrated in greater detail); however, a cylinder-mantle-like form with an opening 26 (as illustrated) is also preferable here in order to keep the material complexity and weight of the apparatus low.

Figure 5A:
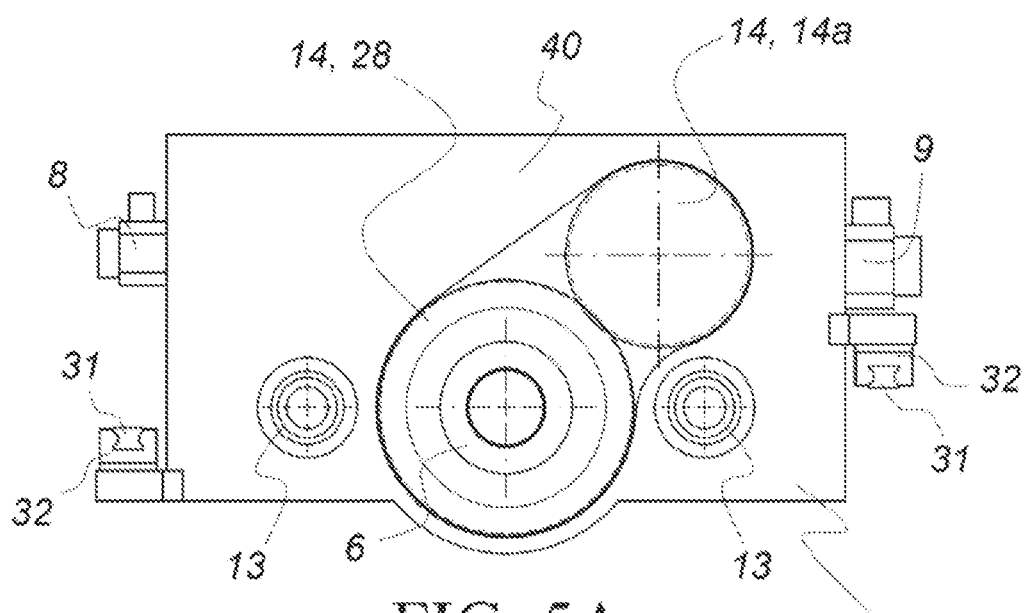
FIG. 5A is a schematic plan view of the drive platform of FIG. 4.
Figure 5B:
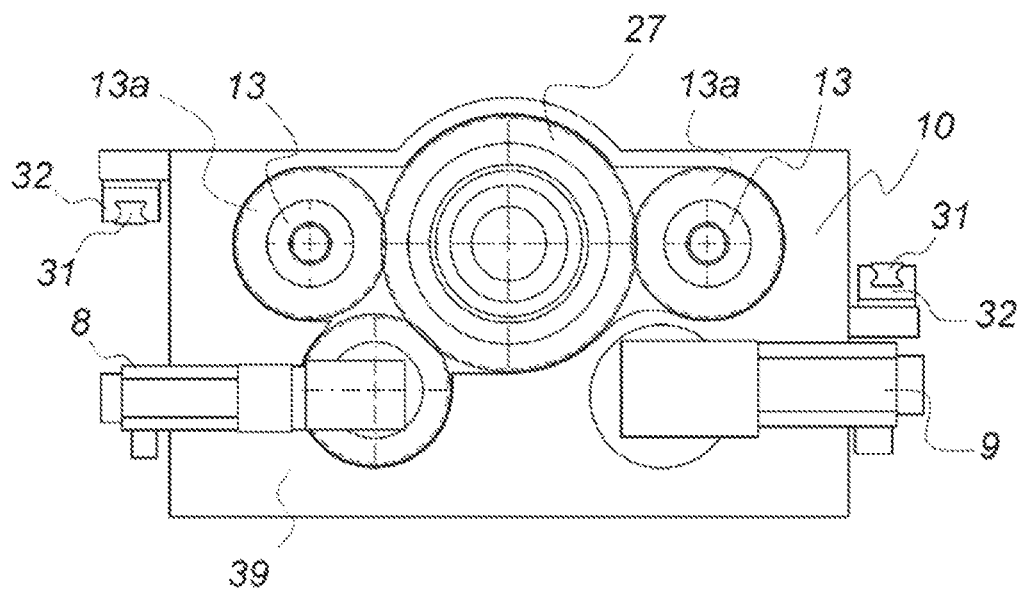
FIG. 5B is a schematic bottom view of the drive platform of FIG. 4.

FIG. 4 as a schematic longitudinal section through the center axis 5 and the middle axes 12a of the jacking rods 12, FIG. 5A as a schematic view of the upper side 40 and FIG. 5B as a schematic view of the lower side 39 illustrate an exemplary drive platform 10 of the apparatus from FIG. 1. It should be noted that the apparatus of FIG. 1 here has a total of four drive platforms 10 which are substantially structurally identical for the four coupling members 6 (each with individual diameters) which are arranged for compact construction here with an alternating orientation on the machine frame.

The drive platform 10 has an individual first drive device 8 which is arranged here on the lower side 39 of the drive platform 10. The first drive device 8 drives a first intermediate ring 27 which is rotatably supported about the center axis 5. The first intermediate ring 27 is constructed here as a toothed ring with an external toothing (not illustrated in greater detail) and is also arranged here on the lower side 39 of the drive platform 10.

Again, two jacking pieces 13 are coupled to this first intermediate ring 27. To this end, the jacking pieces 13 are rigidly secured to a respective externally toothed transmission ring 13a. In this case, the externally toothed transmission rings 13a engage at mutually opposite locations with the first intermediate ring 27, wherein the center axis 5 is located precisely between these locations.

The jacking pieces 13 are constructed with an inner thread (not illustrated in greater detail), with which they are screwed onto the jacking rods 12 which are constructed as threaded rods. The jacking pieces 13 are axially secured on the drive platform 1 to a jacking piece bearing 13b by radial engagement. However, the jacking pieces 13 are—together with the externally toothed transmission rings 13a—supported rotatably about the middle axes 12a of the jacking rods 12.

Consequently, both jacking pieces 13 can be rotated about the middle axes 12a via the first drive device 8 and screwed around the jacking rods 12, whereby the drive platform 10 is carried and displaced in an axial direction AR.

The drive platform 1 further has an individual second drive device 9 which is also constructed here as a servo motor and which is also arranged here on the lower side 39 of the drive platform 1. In this instance, the second drive device 9 directly drives a transmission toothed wheel 14a which is arranged in a recess on the upper side 40 of the drive platform 1. The transmission toothed wheel 14a engages in an externally toothed second intermediate ring 28 which is rigidly connected to the coupling member 6 via a coupling flange 28a in the region of the lower portion 18. The second intermediate ring 28 is rotatably supported about the center axis 5. The second intermediate ring 28 can direct axial forces from the coupling member 6 downward into the drive platform 10, on which it is positioned; accordingly, the coupling member 6 is supported in an axially secure manner on the drive platform 10 (for the bending process). Preferably, the second intermediate ring 28 or the coupling member 6 is also secured to prevent any axial displacement upwardly with respect to the drive platform 10 (for instance, with stops which engage over in a radial direction, not illustrated in greater detail).

The transmission toothed wheel 14a and the second intermediate ring 28 form in this case a gear mechanism 14, with which the second drive device 9 can rotate the coupling member 6 on the drive platform 10 about the center axis 5.

In this case, each drive platform 10 has two counter-pieces 32 which are secured on it. Each counter-piece 32 engages around one of the rails 31 in order to additionally guide the drive platform 10 and in particular to additionally secure it against tilting (in particular, tilting of a surface normal of the upper side 40 of the drive platform 10 relative to the center axis 5).

The coupling member 6 is rigidly secured with the rear portion 18 thereof to the coupling flange 28a. An anterior (upper) end piece 29 of the coupling member 6 is replaceably secured to the upper end of the rear portion 18 (for instance, via screw connections, not illustrated in greater detail). The end piece 29 comprises here the front portion 16 of the coupling member 6 and an intermediate flange 41 (in which screw holes can be provided in a radially external manner, not illustrated in greater detail) into which the front portion 16 merges. The coupling recesses 7 or the crown 7a are constructed at the upper end on the front portion 16.

With the apparatus according to the invention, the radial layers of ends of bar conductors can be bent independently of each other, wherein the coupling members can be controlled axially and radially independently of each other. This can be used particularly in order to select the strokes of the axial movements and the rotation angle ranges during bending of the bar conductors 2 in the different layers L1 (radially internal), L2, L3 and L4 (radially external) to be different in a selective manner, as schematically illustrated by way of example in FIG. 6a and FIG. 6b. It should be noted that in FIG. 6A and FIG. 6B the extent of bends, lengths and shortenings are illustrated in a partially exaggerated and partially understated manner in order to explain the effects and features of the invention.

Figure 6A:
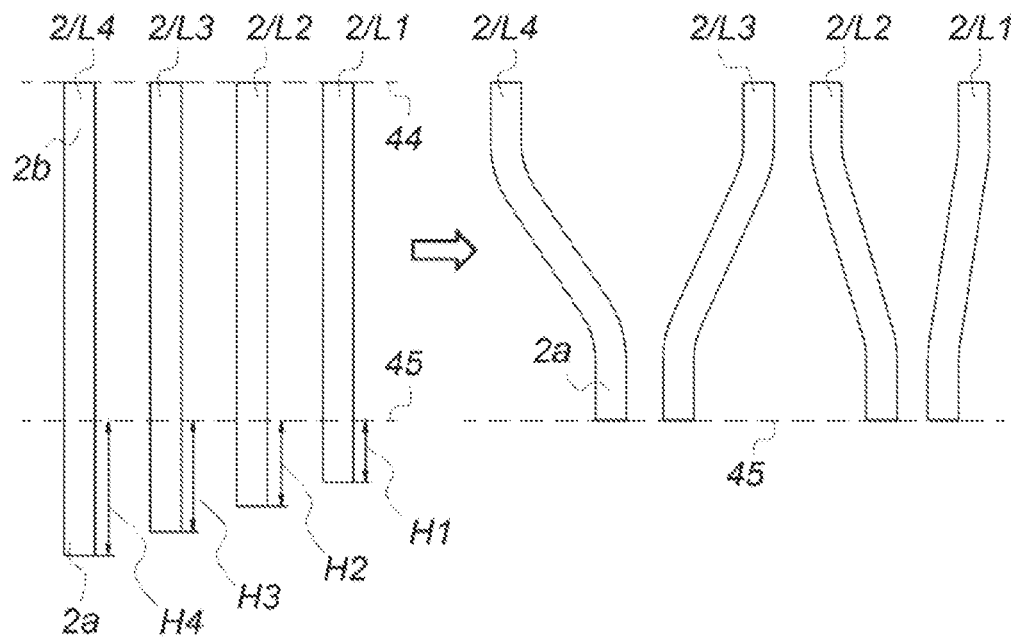
FIG. 6A is a schematic illustration of the axial shortening of bar conductors during bending during use of the apparatus of FIG. 1 according to the invention and a selection of axial strokes of the coupling members according to the invention.
Figure 6B:
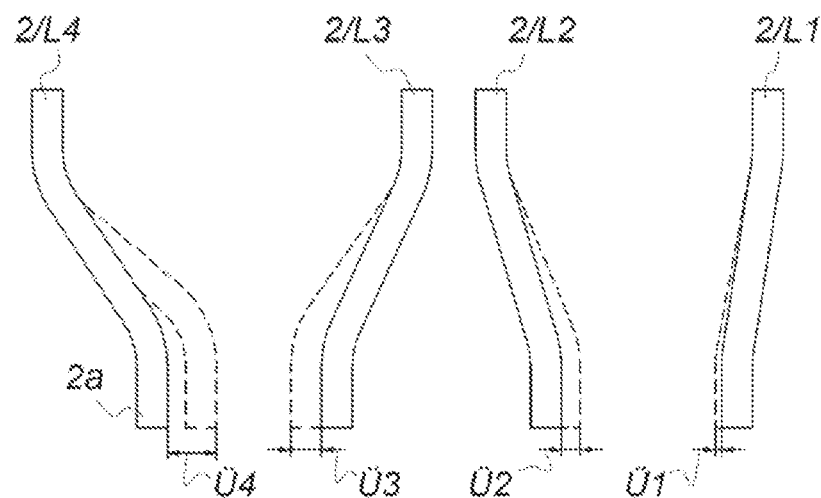
FIG. 6B is a schematic illustration of the resilient springing back of bar conductors during bending during use of the apparatus of FIG. 1 according to the invention and a selection of overbending angle ranges of the coupling members according to the invention.

The starting position initially involves non-deformed (not yet plastically deformed) bar conductors 2 or non-deformed free ends (end portions) 2a in the layers L1 to L4, cf. FIG. 6a on the left. The upper ends 2b of the bar conductors 2 (where applicable also curved members of hairpin bar conductors, not illustrated in greater detail) are located here at the same (axial) height 44. The length of the bar conductors 2 is longest in this case in the radially outermost layer L4 and decreases from layer to layer in a radially inward direction so that the shortest bar conductors 2 are present in the innermost layer L1, cf. FIG. 6a, on the left.

With the apparatus according to FIG. 1, the lower ends 2a of the bar conductors 2 are now bent with the coupling members, wherein the coupling members in the different layers L1-L4 will initially be coupled at different heights to the ends 2a of the bar conductors 2. During the bending process, the bar conductors 2 are bent in a circumferential direction (in this case, from layer to layer in an alternating rotational direction in this case) and, after the bending, the bar conductors 2 of a radial row appear as illustrated on the right in FIG. 6a (here, illustrated beside each other for simplicity). The lower ends 2a of the bar conductors 2 are now located at the same (axial) height 45. To this end, the coupling members in the different layers L1-L4 have travelled different axial strokes H1-H4 which can be readily set with the apparatus according to the invention. The axial strokes H1 to H4 increase from the innermost layer L1 from H1 from layer to layer in a radially outward direction as far as the radially outermost layer L4 to H4.

However, the end position of the bar conductors 2 as shown in FIG. 6a is only reached in many applications when, during the bending process, an overbending is carried out in a circumferential direction in order to take into consideration a resilient spring motion ("springing back") after releasing the coupling members. The bar conductors 2 must then initially be bent into the positions shown with broken lines in FIG. 6b so that the desired position illustrated with solid lines or associated permanent (plastic) deformation of the bar conductors 2 is produced after the springing back action. In this case, the spring motion or the necessary overbending angle range Ü1-Ü4 is smallest for the application shown for the radially innermost layer L1 at Ü1 and increases from layer to layer in a radially outward direction and is greatest at the radially outermost layer L4 at Ü4.

A basic rotation angle range BDW which corresponds to the angular difference from the starting position and desired final position of the bar conductors 2 is identical for the shown application for all the layers L1-L4. However, since increasingly greater overbending angle ranges Ü1 to Ü4 are necessary to this end in an outward direction, the actually driven rotation angle ranges DWI of the coupling members must increase in an outward direction, with $$DWI(L1)=BDW+Ü1,$$

$$DWI(L2)=BDW+Ü2,$$

$$DWI(L3)=BDW+Ü3 \text{ and}$$

$$DWI(L4)=BDW+Ü4.$$

The rotation angle range DWI which is actually intended to be driven in the respective layer L1-L4 can be readily adjusted with the apparatus according to the invention. After the bending process, the resultant remaining rotation angle range is then in the shown application in all the layers L1-L4 identical to the desired basic rotation angle range BDW.

It should be noted that in other applications differently distributed overbending angle ranges of the layers can also be applied, for example, with overbending angle ranges which decrease in a radially outward direction. The overbending angle ranges which are intended to be applied can particularly depend on the bar conductor cross section and bar conductor material or also on the bending geometry of the respective layer.

If the necessary overbending is taken into consideration and precisely adjusted during the bending process according to the invention, the bar conductor ends can be welded in the subsequent production step approximately without any mechanical stresses, which simplifies the welding process and which allows a more precise production of the entire stator including the bar conductors 2 thereof for the electrical machine.

The individual rotational control (rotation) of the coupling members during the bending process can also be used to configure azimuthal connection distances between bar conductor ends at different pairs of layers. For example, an electrical connection between azimuthally nearest neighbors can be provided in a pair of layers and an electrical connection to azimuthally next-but-one neighbors in another pair of layers. This is readily possible with the apparatus according to the invention.

In summary, the invention relates to an apparatus (1) for bending ends (2a), which are arranged in annular layers (L1-L4), of bar conductors (2) which are arranged in a stator base member (3a) for an electrical machine, comprising a plurality of coaxially arranged coupling members (6) with coupling recesses (7), with which the ends (2a) of the bar conductors (2) can be gripped and plastically deformed in layers. There is provided for each coupling member (6) a drive platform (10) which can be displaced in an axial direction (AR) together with the coupling member (6). The coupling member (6) which belongs to a drive platform (10) can be rotated on the drive platform (10). All the drive platforms (10) move axially on a common jacking rod assembly (11). Each drive platform (10) has an individual first drive device (8) for axially displacing the drive platform (10) and an individual second drive device (9) for rotating the coupling member (6) on the drive platform (10), wherein the two drive devices (8, 9) are displaced axially together with the drive platform (10). The apparatus (1) is simply constructed and takes up little structural space.

LIST OF REFERENCE NUMERALS

1 Apparatus (also referred to as twist machine)
2 Bar conductor
2a Lower end (bar conductor)
2b Upper end (bar conductor)
3 Stator
3a Stator base member
4 Holder
5 Center axis
6 Coupling member
7 Coupling recess
7a Crown
8 First drive device
9 Second drive device
10 Drive platform
11 Jacking rod assembly
12 Jacking rod (here: threaded rod)
12a Middle axis (jacking rod)
13 Jacking piece (here: threaded nut)
13a Transmission ring
13b Bearing
14 Gear mechanism
14a Transmission toothed wheel
15 External (not innermost) coupling member
16 Front portion
18 Rear portion
20 Innermost coupling member
21 Front portion (innermost coupling member)
22 Rear portion (innermost coupling member)
26 Opening
27 First intermediate ring
28 Second intermediate ring
28a Coupling flange
29 End piece
30 Rail system
31 Rail
32 Counter-piece
33 Additional platform
34 Additional drive device
35 Additional jacking piece
36 Additional counter-piece
37 Machine frame
38 Radial row (ends of bar conductors)
39 Lower side
40 Upper side
41 Intermediate flange
42 Leg
43 Curved member
44 Same height (upper ends)
45 Same height (lower ends)
AR Axial direction (also referred to as axis direction)
BDW (Desired) basic rotation angle range
DWI (Actually driven) rotation angle range
ED First diameter (upper portion/external coupling member)
EDI First diameter (upper portion/innermost coupling member)
RR Radial direction
UR Circumferential direction
Ü1-Ü4 Overbending rotation angle range
ZD Second diameter (rear portion/external coupling member)
ZDI Second diameter (rear portion/innermost coupling member)

What is claimed is:

1. An apparatus for bending ends, arranged in at least four annular layers, of straight or bent bar conductors arranged in at least four annular layers of a stator of an electrical machine of an electric motor or generator, the apparatus comprising:
   a holder, in particular a clamping holder, for the stator;
   at least four coupling members which are arranged concentrically with respect to a center axis of the apparatus wherein a front end of each of the coupling members has a large number of annularly arranged coupling recesses for gripping the ends of the bar conductors of one of the annular layers, respectively; and
   wherein each coupling member has a first drive device for displacing the coupling member in an axial direction of the center axis and a second drive device for rotating the coupling member about the center axis so that all the coupling members can be axially displaced and rotated independently of each other;
   wherein an individual drive platform is provided for each coupling member, wherein each coupling member is rotatable but axially fixedly supported on the respective drive platform about the center axis, wherein the drive platforms are individually displaceably arranged on a common fixed jacking rod assembly along the center axis, wherein the jacking rod assembly comprises at least two jacking rods which are arranged parallel with the center axis, and wherein each respective drive platform has:
   the first drive device and the second drive device of the coupling member provided for the respective drive platform;

at least two jacking pieces for axially displacing the respective drive platform along the axial direction, wherein the jacking pieces are axially secured to the drive platform and are each coupled to one of the jacking rods, and wherein the jacking pieces are driven by the first drive device of the respective drive platform; and a gear mechanism for rotating the coupling member relative to the drive platform, wherein the gear mechanism is coupled to the coupling member of the respective drive platform and is driven by the second drive device of the respective drive platform.

2. The apparatus as claimed in claim 1, wherein at least outer coupling members of the coupling members, which are the coupling members which are not an innermost coupling member, have a substantially cylinder-mantle-like front portion with a first diameter ED corresponding to a diameter of the annular arrangement of the coupling recesses and a similarly substantially cylinder-mantle-like rear portion with a second diameter ZD, with ZD>ED, and the innermost coupling member also has a front portion and a rear portion, wherein the front portion of the innermost coupling member is also constructed in a substantially cylinder-mantle-like manner with a first diameter EDI corresponding to a diameter of the annular arrangement of the coupling recesses of the innermost coupling member and the rear portion of the innermost coupling member is also constructed in a substantially cylinder-mantle-like manner with a second diameter ZDI, with ZDI>EDI, wherein the front portions and the rear portions of the coupling members are arranged in a state inserted one in the other, and wherein the respective gear mechanism is coupled to the respective coupling member at the rear portion of the respective coupling member.

3. The apparatus as claimed in claim 2, wherein at least the drive platforms of the outer coupling members have an opening for introducing one or more coupling members which are located further inward.

4. The apparatus as claimed in claim 3, wherein the jacking rods are constructed as threaded rods and the jacking pieces are constructed as threaded nuts.

5. The apparatus as claimed in claim 3, wherein the jacking rods are constructed as toothed racks and the jacking pieces are constructed as toothed wheels or worm gears.

6. The apparatus as claimed in claim 1, wherein the jacking rods are arranged symmetrically about the center axis, wherein precisely two mutually opposite jacking rods are provided.

7. The apparatus as claimed in claim 1, wherein a first intermediate ring is rotatably supported about the center axis on each respective drive platform, wherein the first intermediate ring is driven by the first drive device of the respective drive platform and wherein the jacking pieces are each coupled at different locations to the first intermediate ring, wherein the jacking pieces are arranged symmetrically relative to the center axis on the first intermediate ring.

8. The apparatus as claimed in claim 1, wherein each gear mechanism, which is driven by the second drive device, comprises a toothed wheel or a toothed rack and engages in a tooth arrangement on the respective coupling member or on a second intermediate ring which is rigidly connected to the respective coupling member.

9. The apparatus as claimed in claim 1, wherein the coupling recesses of each coupling member are constructed on an end piece which is secured to a remainder of the respective coupling member in a replaceable manner.

10. The apparatus as claimed in claim 1, wherein the coupling recesses at the front end of each coupling member are constructed in a crown-like manner.

11. The apparatus as claimed in claim 1, wherein the apparatus further comprises a rail system having at least two fixed rails which extend parallel with the center axis, and at least two counter-pieces for each of the drive platforms which are each arranged in an axially displaceable manner on one of the rails are further fixed or constructed on each drive platform.

12. The apparatus as claimed in claim 1, wherein the holder for the stator is arranged on an additional platform, wherein the additional platform is also displaceably arranged on the jacking rod assembly in an axial direction of the center axis, and in that the additional platform has an additional drive device and at least two additional jacking pieces for axially displacing the additional platform, wherein the additional jacking pieces are axially secured to the additional platform and are each coupled to one of the jacking rods, and wherein the additional jacking pieces are driven by the additional drive device.

13. The apparatus as claimed in claim 12, wherein the apparatus further comprises a rail system having at least two fixed rails which extend parallel with the center axis, and at least two counter-pieces for each of the drive platforms which are each arranged in an axially displaceable manner on one of the rails are further fixed or constructed on each drive platform, and wherein at least two additional counter-pieces which are each arranged on one of the rails in an axially displaceable manner are further fixed or constructed on the additional platform.

14. The apparatus as claimed in claim 1, wherein the holder is a clamping holder.

15. A method of using the apparatus as claimed in claim 1 for bending ends, which are arranged in the at least four annular layers, of straight or bent bar conductors of the stator of the electrical machine of the electric motor or generator, the method comprising:

arranging the stator in the holder, and engaging the ends of the bar conductors, which are arranged in the stator, of a respective annular layer over by the coupling recesses of a respective coupling member, wherein the axial movements and the rotational movements of the coupling members are controlled independently of each other, and wherein the directions of rotation alternate between the coupling members which follow each other radially.

16. The method as claimed in claim 15, wherein strokes of the axial movements of the coupling members increase in an outward direction when the ends of the bar conductors of the stator are bent, wherein the rotation angle ranges of the rotational movements of the coupling members increase in an outward direction.

* * * * *

UNITED STATES PATENT AND TRADEMARK OFFICE
CERTIFICATE OF CORRECTION

PATENT NO. : 11,791,700 B2
APPLICATION NO. : 17/447412
DATED : October 17, 2023
INVENTOR(S) : Juergen Peschina and Peter Haberstroh Page 1 of 1

It is certified that error appears in the above-identified patent and that said Letters Patent is hereby corrected as shown below:

In the Claims

Column 14, Claim 1, Lines 37-38, "ends, arranged in at least four annular layers," should read --ends--.

Column 14, Claim 1, Line 42, "holder, in particular a clamping holder," should read --holder--.

Signed and Sealed this
Fifth Day of December, 2023

Katherine Kelly Vidal
*Director of the United States Patent and Trademark Office*